United States Patent
Horiguchi

(10) Patent No.: US 10,514,255 B2
(45) Date of Patent: Dec. 24, 2019

(54) ECCENTRICITY CALCULATING METHOD, ROTARY ENCODER, ROBOTIC ARM AND ROBOT APPARATUS

(71) Applicant: CANON KABUSHIKI KAISHA, Tokyo (JP)

(72) Inventor: Haruhiko Horiguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 15/695,365

(22) Filed: Sep. 5, 2017

(65) Prior Publication Data
US 2018/0094924 A1 Apr. 5, 2018

(30) Foreign Application Priority Data
Sep. 30, 2016 (JP) .................. 2016-194940

(51) Int. Cl.
*G01B 21/20* (2006.01)
*G01B 21/04* (2006.01)
(Continued)

(52) U.S. Cl.
CPC .......... *G01B 21/20* (2013.01); *G01B 21/045* (2013.01); *G01D 5/12* (2013.01); *G01D 5/24471* (2013.01);
(Continued)

(58) Field of Classification Search
CPC ........ G01B 21/045; G01B 21/20; G01D 5/12; G01D 5/24471; G01D 5/34; G01D 5/36; G06F 17/17
(Continued)

(56) References Cited

U.S. PATENT DOCUMENTS 10,189,159 B1* 1/2019 Wilson .................. B25J 9/1653
2005/0264795 A1* 12/2005 Murata .................. G01B 11/27
356/127
(Continued)

FOREIGN PATENT DOCUMENTS

CN 1975336 6/2007
CN 100458393 2/2009
(Continued)

OTHER PUBLICATIONS

European Search Report dated Feb. 2, 2018 in European Application No. 17190513.6.
Chinese Office Action dated Sep. 3, 2019 during prosecution of related Chinese application No. 201710885367. (Whole English-language translation included.).

*Primary Examiner* — John H Le
(74) *Attorney, Agent, or Firm* — Venable LLP

(57) ABSTRACT

The present invention provides: a rotary encoder checking an eccentricity state of a scale by sensor units; and related matters. The scale moves, relatively to the sensor units, around a rotational axis line. The pair of sensor units are arranged opposite to each other sandwiching the rotational axis line C0 therebetween. A processing system acquires output signals from each of the sensor units, at a plurality of rotation angles at which the scale has moved relatively to the sensor units. The processing system determines first phase information based on the output signal obtained from the sensor unit, and second phase information based on the output signal obtained from the sensor unit. The processing system determines eccentricity information based on a differential value between any one of the first phase information and the second phase information and an average value of the first phase information and the second phase information.

17 Claims, 11 Drawing Sheets

(51) Int. Cl.
*G01D 5/12* (2006.01)
*G01D 5/244* (2006.01)
*G01D 5/34* (2006.01)
*G01D 5/36* (2006.01)
*G06F 17/17* (2006.01)

(52) U.S. Cl.
CPC ............... *G01D 5/34* (2013.01); *G01D 5/36* (2013.01); *G06F 17/17* (2013.01)

(58) Field of Classification Search
USPC .............. 702/94, 155; 29/602.1; 250/231.16; 356/127
See application file for complete search history.

(56) References Cited

U.S. PATENT DOCUMENTS

2008/0189934 A1* 8/2008 Henshaw ........... G01D 5/24452
 29/602.1
2011/0147572 A1 6/2011 Nakamura

FOREIGN PATENT DOCUMENTS

| | | |
|---|---|---|
| CN | 100585336 | 1/2010 |
| EP | 1 790 951 A1 | 5/2007 |
| JP | 2003-130688 A | 5/2003 |
| JP | 2007-178320 | 7/2007 |
| JP | 4749154 B2 | 8/2011 |

\* cited by examiner

INSIDE SCALE    OUTSIDE SCALE

ECCENTRICITY CALCULATING METHOD, ROTARY ENCODER, ROBOTIC ARM AND ROBOT APPARATUS

BACKGROUND OF THE INVENTION

Field of the Invention

The present invention relates to a technology for obtaining eccentricity information of a scale of a rotary encoder.

Description of the Related Art

A rotary encoder is known which relatively rotates a scale having a pattern with respect to a sensor unit around a rotational axis line, makes the sensor unit read the pattern, and determines a rotation angle of the scale.

Rotary encoders include an incremental type and an absolute type, but in order to detect the rotation angle with high accuracy, countermeasures against an eccentricity error of the scale with respect to the rotational axis line are necessary.

For this reason, a technique has been proposed which includes considering the characteristics of the eccentricity error, arranging a pair of sensor units at positions symmetric with respect to the rotational axis line, and determining a rotation angle from which the eccentricity error has been removed (see Japanese Patent No. 4749154). In Japanese Patent No. 4749154, the technique includes calculating an eccentricity factor from previously stored parameters Ψ and Φ, and correcting a value of measured angle.

On the other hand, a rotary encoder has been also proposed which outputs a rotation signal that indicates an amount of rotation of an encoder wheel and outputs an eccentricity signal that indicates eccentricity quantity, by using a photodetector for rotation detecting and a photodetector for eccentricity detecting (see Japanese Patent Application Laid-Open No. 2003-130688).

However, even in the case where the rotation angle of the scale is determined, from which the eccentricity error has been removed, as in Japanese Patent No. 4749154, in order to accurately determine the rotation angle, the eccentricity quantity of the scale from the rotational axis line must be within the allowable range. In addition, the eccentricity quantity of the scale from the rotational axis line varies depending also on a period of service and the situation of use of the rotary encoder. Therefore, in the case in which the eccentricity quantity exceeds the allowable range in the initial state, or in the case in which the eccentricity quantity exceeds the allowable range due to the period of service or the situation of use, even though the rotation angle is determined with the use of a value of the previously stored eccentricity factor, there has been a problem that the determined rotation angle results in greatly deviating from a true value.

In such a case, in order to check the eccentricity state, it is considered to provide a detector for eccentricity detecting on the rotary encoder in addition to a pair of sensor units as in Japanese Patent Application Laid-Open No. 2003-130688, but there has been a problem that the rotary encoder is jumboized or the cost increases.

Then, an object of the present invention is to enable the eccentricity state of a scale to be easily checked with the use of a pair of sensor units.

SUMMARY OF THE INVENTION

According to an aspect of the present invention, provided is an eccentricity calculating method for determining eccentricity information of a center line of a scale with respect to a rotational axis line, in a rotary encoder, wherein the rotary encoder has the scale in which a pattern is arranged, and has a pair of sensor units that read the pattern of the scale, wherein the scale moves, relatively to the pair of sensor units, around the rotational axis line, and the pair of sensor units are arranged so as to be opposite to each other sandwiching the rotational axis line therebetween, the eccentricity calculating method comprising: acquiring an output signal from each of the pair of sensor units, in a plurality of rotation angles by which the scale has been moved relatively to the pair of sensor units, determining first phase information based on the output signal that has been obtained from one of the pair of sensor units, and second phase information based on the output signal that has been obtained from the other one of the pair of sensor units, determining a differential value between any one of the first phase information and the second phase information and an average value of the first phase information and the second phase information, and determining the eccentricity information, based on the differential value.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
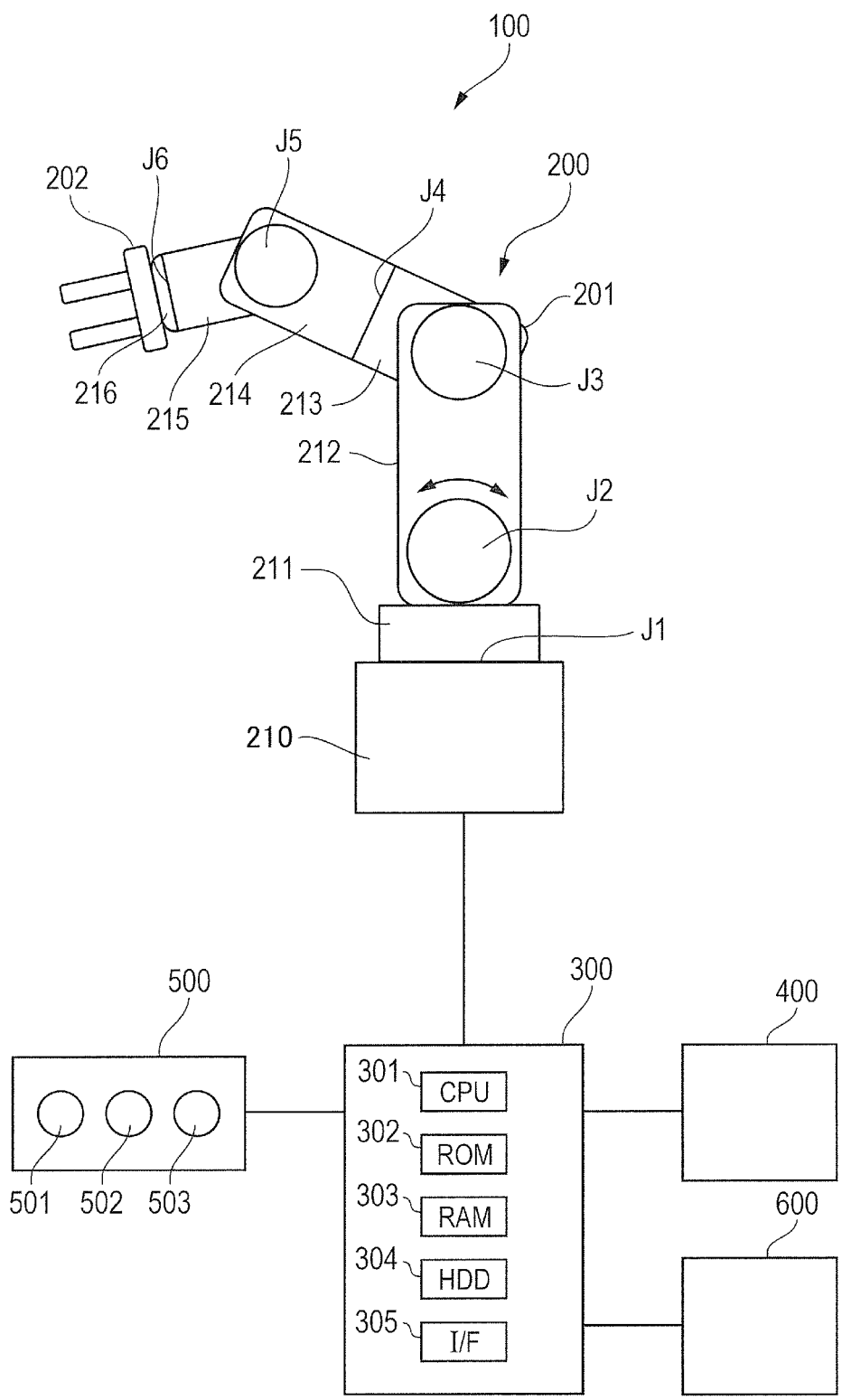
FIG. 1 is an explanatory view illustrating a robot apparatus according to a first embodiment.

FIG. 1 is an explanatory view illustrating a robot apparatus according to a first embodiment. The robot apparatus 100 illustrated in FIG. 1 includes: a robot 200; a control apparatus 300 that controls the operation of the robot 200; a teaching pendant 400 that acts as an input unit; a lamp unit 500 that acts as a warning unit; and a display apparatus 600 that acts as a display unit.

The robot 200 has: a vertically articulated robotic arm 201; and a robotic hand 202 that is mounted on the front-end of the robotic arm 201 and acts as an end effecter.

The robotic arm 201 has a base unit (link on base end side) 210 that is fixed to a trestle, and a plurality of links 211 to 216 that transmit each displacement and force, and is structured so that the links 210 to 216 are connected by joints J1 to J6 in a swingable or rotatable manner. The robotic hand 202 is mounted on the link (link on front-end side) 216.

Figure 2:
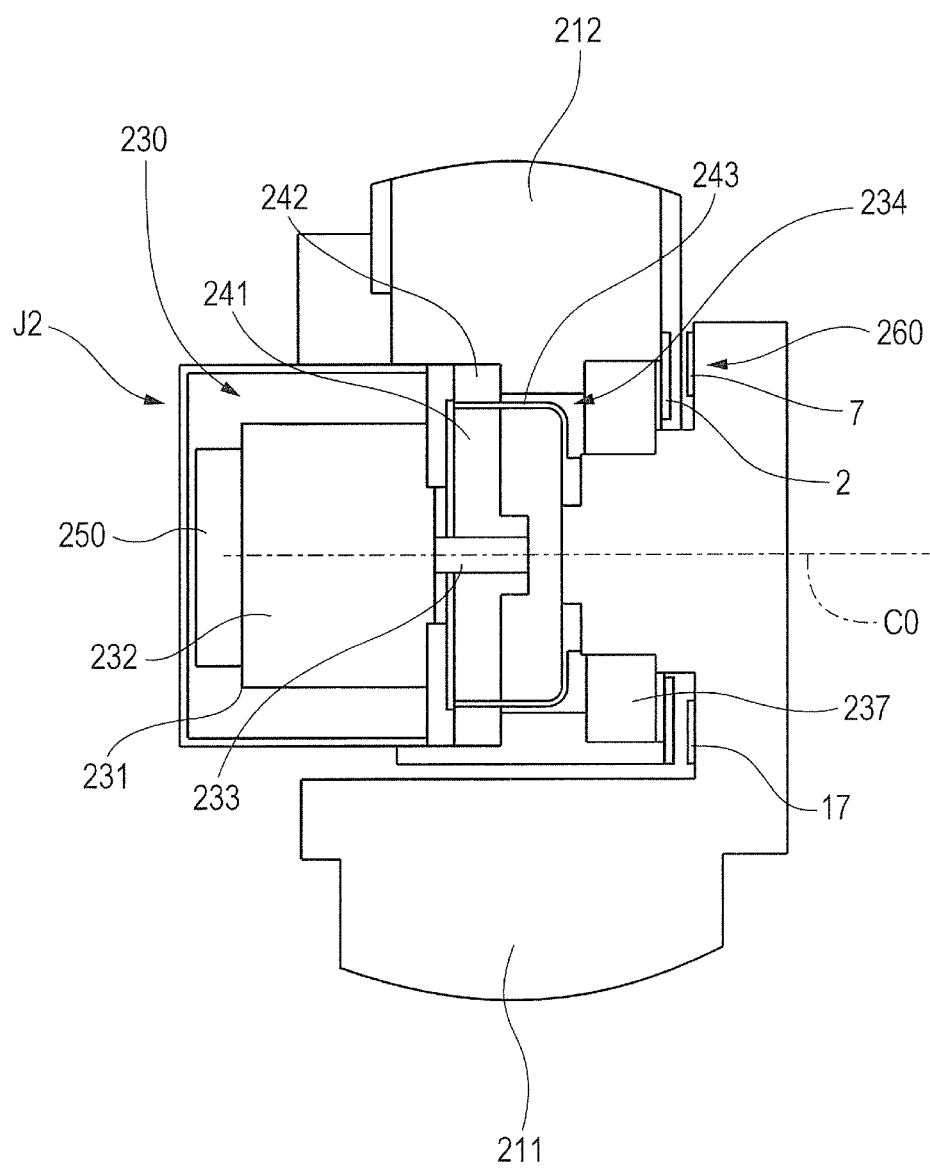
FIG. 2 is a partial cross-sectional view illustrating a joint of a robotic arm of the robot apparatus according to the first embodiment.

FIG. 2 is a partial cross-sectional view illustrating the joint J2 of the robotic arm 201 of the robot apparatus 100 according to the first embodiment. The joint J2 will be described below as a representative example. The other joints J1 and J3 to J6 have similar configurations, and accordingly the description will be omitted.

A pair of links 211 and 212 of the robotic arm 201 are rotatably coupled to each other through a cross roller bearing 237. The robotic arm 201 has a driving apparatus 230 that drives the joint J2. Specifically, the driving apparatus 230 relatively drives the link (second link) 212 with respect to the link (first link) 211.

The driving apparatus 230 has a rotary motor (hereinafter referred to as "motor") 231 that acts as a driving source, and a speed reducer 234.

The motor 231 is a servomotor, and for instance, is a brushless DC servomotor or an AC servomotor. The motor 231 has a housing 232 that is fixed to the link 212; and has an unillustrated stator and an unillustrated rotator that are housed in the housing 232. The unillustrated stator is fixed to the inside of the housing 232. A rotary shaft 233 is fixed to the unillustrated rotator.

The speed reducer 234 is a wave gear speed reducer in the present embodiment. The speed reducer 234 includes: a web generator 241 that is coupled to a rotary shaft 233 of the motor 231; and a circular spline 242 that is fixed to the link 212. The speed reducer 234 has a flex spline 243 that is arranged between the web generator 241 and the circular spline 242 and is fixed to the link 211. The flex spline 243 is decelerated at a predetermined speed reducing ratio with respect to the rotation of the web generator 241, and relatively rotates with respect to the circular spline 242. Accordingly, the rotation of the rotary shaft 233 of the motor 231 is decelerated at a predetermined speed reducing ratio by the speed reducer 234, and relatively rotates the link 212 to which the circular spline 242 is fixed with respect to the link 211 to which the flex spline 243 is fixed, around a rotational axis line C0.

In the joint J2, a rotary encoder 250 is provided that detects the rotation angle of the rotary shaft 233 of the motor 231. In addition, in the joint J2, a rotary encoder 260 is provided that detects an angle of the link 212 with respect to the link 211 (angle of joint J2).

The rotary encoder 260 has a scale 2 that is arranged on one link 212 of the pair of links 211 and 212; and a pair of sensor units 7 and 17 that are arranged on the other link 211. The scale 2 is fixed to the link 212 with a fastening member such as a screw, so as to be positionally adjustable with respect to the link 212. The link 212 rotates with respect to the link 211, and thereby the scale 2 relatively rotates with respect to the pair of sensor units 7 and 17, around the rotational axis line C0. The pair of sensor units 7 and 17 are arranged in symmetric positions with respect to the rotational axis line C0.

Specifically, in the case in which the scale 2 is viewed from the pair of sensor units 7 and 17, when the link 211 rotates around the rotational axis line C0 with respect to the link 212, the scale 2 results in rotating around the rotational axis line C0. The case is also similar to the above case, in which the scale 2 is arranged on the link 212 and the pair of sensor units 7 and 17 are arranged on the link 211.

In the present embodiment, the rotary encoders 250 and 260 are the absolute type. Here, the rotary encoders 250 and 260 may be the incremental type. Incidentally, the rotary encoder 250 detects the phase information (rotation angle) of the rotary shaft 233 of the motor 231, and accordingly in the case in which the speed reducer 234 has a speed reducing ratio, for instance, of 50:1, when the link 212 rotates one time with respect to the link 211, the rotary shaft 233 of the motor 231 rotates 50 times. Accordingly, the rotary encoder 260 needs to detect the rotation angle with higher accuracy than the rotary encoder 250. In other words, the rotary encoder 260 needs to be mounted with high accuracy with respect to the rotational axis line C0. In the present embodiment, a processing apparatus of the rotary encoder 260, which will be described later, determines the eccentricity information of the center line of the scale 2 with respect to the rotational axis line C0.

The control apparatus 300 is structured of a computer, and includes a CPU (Central Processing Unit) 301. The control apparatus 300 also includes a ROM (Read Only Memory) 302, a RAM (Random Access Memory) 303 and an HDD (Hard Disk Drive) 304. In addition, the control apparatus 300 includes an interface (I/F) 305. To the CPU 301, the ROM 302, the RAM 303, the HDD 304 and the interface 305 are connected through a bus. To the interface 305, the robot 200, the teaching pendant 400, the lamp unit 500 and the display apparatus 600 are connected.

The CPU 301 acquires output signals corresponding to the phase information from the rotary encoders 250 and 260 in each of the joints J1 to J6 of the robotic arm 201 through the interface 305, and controls the robot 200, specifically, the motor 231 of each of the joints J1 to J6. In addition, the CPU 301 acquires eccentricity information from the rotary encoder 260 of each of the joints J1 to J6 through the interface 305. The CPU 301 controls the lamp unit 500 and the display apparatus 600, based on the acquired eccentricity information.

In the ROM 302, a program is stored for making the CPU 301 execute basic calculation. The RAM 303 is a storage unit that temporarily stores calculation results and the like of the CPU 301 therein. The HDD 304 is a storage unit that stores the calculation processing result of the CPU 301, various data which the CPU 301 has acquired from the outside, and the like therein.

The teaching pendant 400 receives an operation of a user. The lamp unit 500 has a plurality of (three, in the present embodiment) lamps 501, 502 and 503 that emit lights of different colors, respectively. The lamp 501 emits blue light, the lamp 502 emits yellow light, and the lamp 503 emits red light. The blinking of the lamps 501 to 503 is controlled by the CPU 301 of the control apparatus 300.

The display apparatus 600 is, for instance, an apparatus that displays an image thereon, such as a liquid crystal display. The display apparatus 600 displays an image corresponding to the image data which the display apparatus 600 has acquired from the CPU 301 of the control apparatus 300.

Figure 3A:
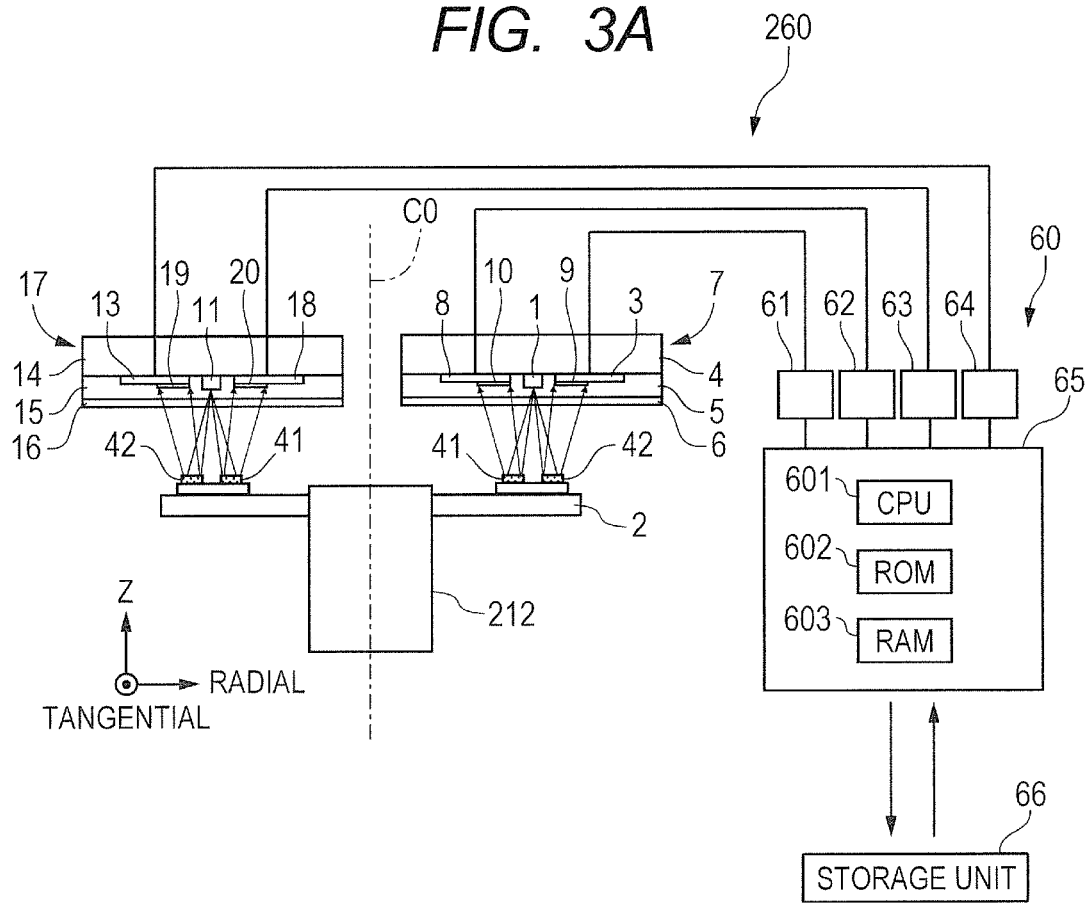
FIG. 3A is an explanatory diagram of a rotary encoder according to the first embodiment.
Figure 3B:
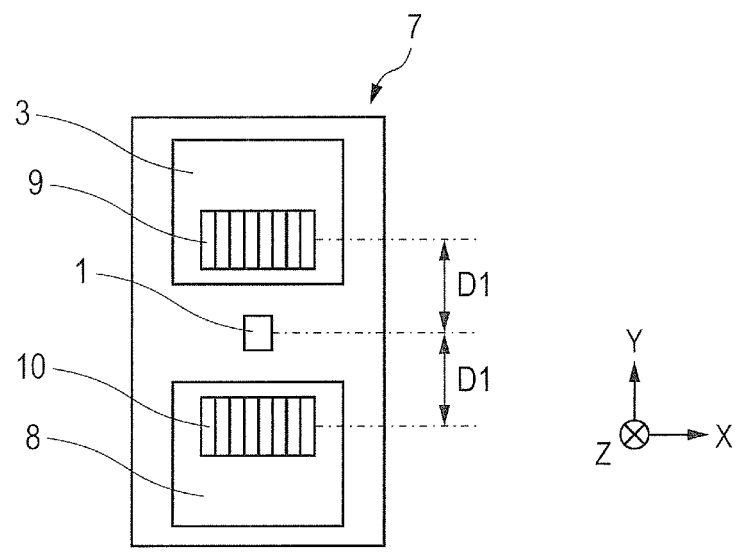
FIG. 3B is a front view of one sensor unit out of a pair of sensor units of the rotary encoder according to the first embodiment.

FIG. 3A is an explanatory diagram of the rotary encoder 260 according to the first embodiment. FIG. 3B is a front view of one sensor unit 7 out of the pair of sensor units 7 and 17 of the rotary encoder 260 according to the first embodiment.

Hereafter, the case will be described in which the rotary encoder 260 is an optical type, but the rotary encoder 260 may be a magnetic type or a capacitive type. In addition, the case will be described below in which the rotary encoder 260 is a light reflecting type, but the rotary encoder 260 may be a light transmission type.

In the present embodiment, a member to which the scale 2 is attached is the link 212, and a member to which the sensor units 7 and 17 are attached is the link 211 (FIG. 2). As is illustrated in FIG. 3A, the rotary encoder 260 has the above described scale 2 and the pair of sensor units 7 and 17, a processing system 60 which is a processing unit, and a storage unit 66.

The pair of sensor units 7 and 17 are arranged at positions that are symmetric by 180 degrees with respect to the rotational axis line C0.

The processing system 60 has a processing apparatus 65 that includes a CPU 601, a ROM 602, a RAM 603 and the like, and processing circuits 61, 62, 63 and 64 that are connected to the processing apparatus 65. The processing circuits 61 and 62 are mounted on, for instance, a printed board 4, and the processing circuits 63 and 64 are mounted on, for instance, a printed board 14. Incidentally, the processing system 60 (processing apparatus 65) may be configured to have a dedicated IC such as ASIC and FPGA. The processing system 60 performs: interpolation processing of the rotary encoder signals (read information) which have been obtained from the sensor units 7 and 17; writing and reading-out of signals (data) to and from the storage unit 66; output of phase information; and the like.

Hereafter, the case will be described in which phase information of output signals that the processing apparatus 65 acquires from the rotary encoders 250 and 260 are angle information corresponding to a rotation angle. Specifically, the case will be described below in which a resolution of 22 bits ($=2^{22}$[LSB]/360[deg.] 4194304[LSB]/360[deg.]) with respect to one rotation (angle 360 [deg.]) of the scale 2 is obtained as angle information.

Firstly, the sensor unit 7 will be described below. As is illustrated in FIG. 3B, the sensor unit 7 includes a light source 1 formed of an LED, a light receiving element 3 having a light-receiving element array 9, and a light receiving element 8 having a light-receiving element array 10. The light source 1 and the light receiving elements 3 and 8 are mounted on the printed board 4, and are sealed by a transparent resin 5. A transparent glass plate 6 is provided on the resin 5. Thus, the sensor unit 7 is a light receiving and emitting type of integral package.

The two light receiving elements 3 and 8 may be configured to have the same structure, because there are then many advantages that the components can be made common and the commonality also leads to cost reduction. Incidentally, the light receiving elements 3 and 8 may have different structures as long as the elements are optimized for the angular modulation periods of the tracks which the light receiving elements 3 and 8 read, respectively.

In the present embodiment, as is illustrated in FIG. 3B, distances between the light emitting center of the light source 1 and the light receiving centers of the light-receiving element arrays 9 and 10 are set to be the same D1. Hereafter, the case will be described in which the distance D1 is set at 1.75 [mm].

The sensor unit 17 includes a light source 11 formed of an LED, a light receiving element 13 having a light-receiving element array 19, and a light receiving element 18 having a light-receiving element array 20. The light source 11 and the light receiving elements 13 and 18 are mounted on the printed board 14, and are sealed by a transparent resin 15. A transparent glass plate 16 is provided on the resin 15. Thus, the sensor unit 17 is a light receiving and emitting type of integral package. In the present embodiment, the sensor unit 17 has the same structure as the sensor unit 7. Thus, the cost reduction can be achieved by the commonality of the components.

Figure 4A:
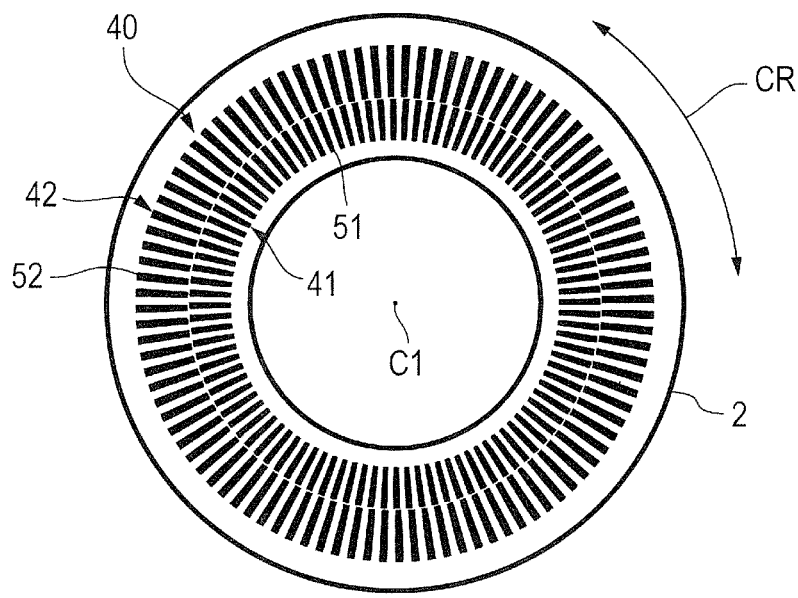
FIG. 4A is a plan view of a scale of the rotary encoder according to the first embodiment.
Figure 4B:
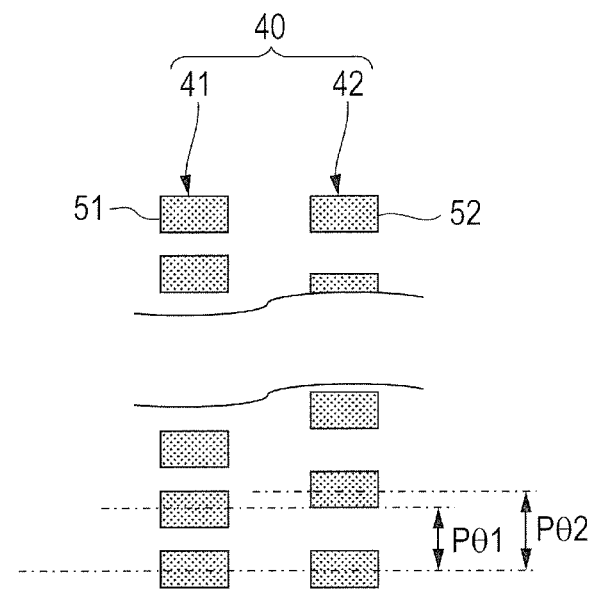
FIG. 4B is a schematic diagram illustrating a pattern of the scale.

FIG. 4A is a plan view of the scale 2 of the rotary encoder 260 according to the first embodiment. FIG. 4B is a schematic diagram illustrating the pattern 40 of the scale 2. As is illustrated in FIG. 4A, the scale 2 is formed in a circular shape which regards the center line C1 as the center, more specifically, in an annular shape in which a through hole is formed in the central portion. The scale 2 has the pattern 40 which the sensor units 7 and 17 are made to read. The pattern 40 is a radial pattern that is arranged, for example, along a circular circumferential direction centered at the center line C1.

The pattern 40 has two tracks 41 and 42. The track 41 that is a first track is a radial track having marks 51 which are a plurality of first marks that are arranged, for example, along a circumferential direction CR which regards the center line C1 as the center. The track 42 that is a second track is a radial track having marks 52 which are arranged in the outside of the track 41, are arranged in the circumferential direction CR, and are a plurality of second marks that have the number different from the number of the marks 51. The plurality of marks 51 of the track 41 are formed radially from the center line C1. The plurality of marks 52 of the track 42 are formed radially from the center line C1. The track 41 is a scale pattern having an angle modulation period P01, and the track 42 is a scale pattern having an angle modulation period P02 that is different from the angle modulation period P01.

Each of the pair of sensor units 7 and 17 are arranged at a position at which each reads both of the tracks 41 and 42. In other words, the light receiving elements 8 and 18 are arranged at positions at which the elements read the track 41, and the light receiving elements 3 and 13 are arranged at positions at which the elements read the track 42.

The scale 2 is structured by the marks 51 and 52 being patterned on a base material, for instance, such as a glass material, which are formed of a chromium film to become a reflecting film. Incidentally, the base material of the scale 2 may be a resin such as polycarbonate or a metal such as SUS; and the reflecting film may be a film made from another material such as an aluminum film, as long as the film reflects light.

In the present embodiment, the angle modulation period P$\theta$1 and the modulation period P$\theta$2 are slightly different from each other. The rotary encoder detects the angle by performing a vernier operation which determines a phase difference between the signals of the angle modulation periods, from these angle modulation periods P$\theta$1 and P$\theta$2, and thereby obtains a periodic signal different from the original periods P$\theta$1 and P$\theta$2. Specifically, the period of the vernier detection signals that are obtained from the angle modulation period P$\theta$1 and the angle modulation period P$\theta$2 becomes the least common multiple of the angle modulation period P$\theta$1 and the angle modulation period P$\theta$2. Accordingly, the angle modulation period P$\theta$1 and the angle modulation period P$\theta$2 are determined so as to become a desired vernier period. For instance, pitches of the marks in the two tracks 41 and 42 slightly deviate from each other in such a way that the angle modulation period P$\theta$1 is 360/1650 [deg.] and the angle modulation period P$\theta$2 is 360/1649 [deg.], and there is a difference of one pitch in 360 [deg.].

As is illustrated in FIG. 3A, divergent luminous fluxes that have been emitted from the light source 1 of the sensor unit 7 which is arranged so as to face the scale 2 irradiate both of the tracks 41 and 42. The luminous flux which has been reflected by the track 41 is reflected toward the light-receiving element array 10 of the sensor unit 7, and the reflectance distribution of the track 41 is received as an image, in the light-receiving element array 10. The luminous flux which has been reflected by the track 42 is reflected toward the light-receiving element array 9 of the sensor unit 7, and the reflectance distribution of the track 42 is received as an image, in the light-receiving element array 9. The luminous fluxes which have been received by the light-receiving element arrays 9 and 10 are converted into electric signals, and position signals which are information read from the tracks 42 and 41 corresponding to the rotation angle of the scale 2 are transmitted to the processing circuits 61 and 62 in the processing system 60.

As for the sensor unit 17 as well, similarly to the sensor unit 7, the divergent luminous fluxes that have been emitted from the light source 11 of the sensor unit 17 which is arranged so as to face the scale 2 irradiate both of the tracks 41 and 42. The luminous flux which has been reflected by the track 41 is reflected toward the light-receiving element array 20 of the sensor unit 17, and the reflectance distribution of the track 41 is received as an image, in the light-receiving element array 20. The luminous flux which has been reflected by the track 42 is reflected toward the light-receiving element array 19 of the sensor unit 17, and the reflectance distribution of the track 42 is received as an image, in the light-receiving element array 19. The luminous fluxes which have been received by the light-receiving element arrays 19 and 20 are converted into electric signals, and position signals which are information read from the tracks 42 and 41 corresponding to the rotation angle of the scale 2 are transmitted to the processing circuits 64 and 63 in the processing system 60.

Figure 5:
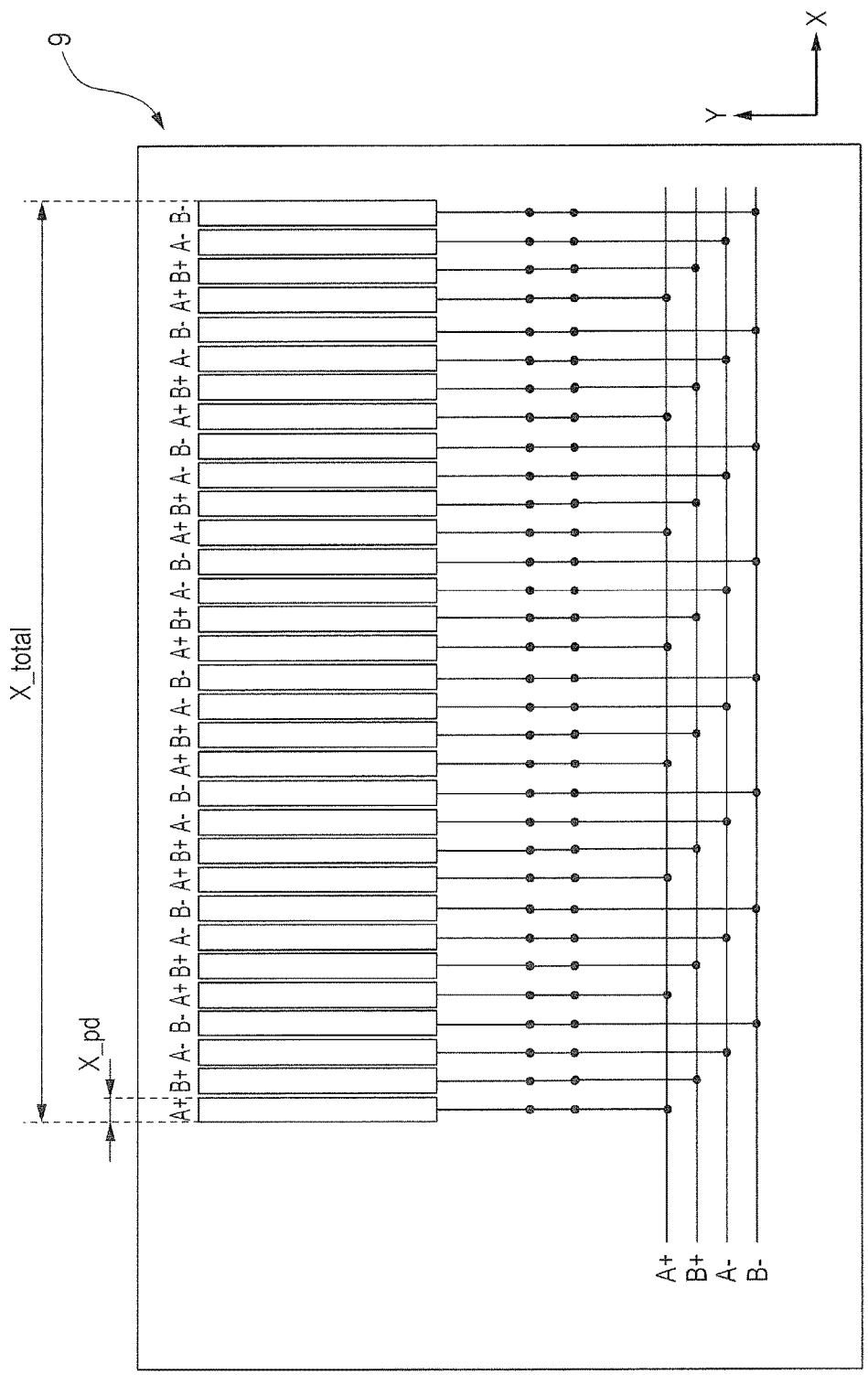
FIG. 5 is a plan view illustrating an arrangement of a light receiving surface of a light-receiving element array of the sensor unit in the rotary encoder.

Here, firstly, the operation for acquiring rotational phase information of the track 42 will be described. FIG. 5 is a plan view illustrating an arrangement of a light receiving surface of a light-receiving element array 9 of the sensor unit 7 in the rotary encoder 260. The light-receiving element array 9 illustrated in FIG. 5 is configured so that 32 pieces of the light receiving elements are aligned side by side at a pitch of 64 μm in an X-direction. One piece of the light receiving element has a width X_pd of 64 μm in the X direction, and a width Y_pd of 800 μm in a Y direction. The total width X_total of the light-receiving element array 9 is 2048 μm.

It is possible to detect angle information of the scale 2, by arranging the X-direction of the light-receiving element array 9 so as to be approximately parallel to the tangential direction of the scale 2, and arranging the Y-direction of the light-receiving element array 9 so as to be approximately parallel to the radial direction of the scale 2. The pattern 40 of the scale 2 becomes a projection having a doubled size, and accordingly the detection range on the scale 2 becomes a range of 1024 μm×400 μm. If a radius position to be read on the scale 2 at the time when the light-receiving element array 9 reads the track 42 is adjusted to 33.593 mm, P$\theta$2 becomes 128 μm, and accordingly the detection range on the track 42 becomes 8×P$\theta$2. Hereafter, an example will be described in which the radial pattern 40 is read with the use of the rectangular light-receiving element array 9, but the shape of the light receiving portion may be a radial shape so as to fit the shape of the pattern 40. In the present embodiment, the light-receiving element arrays 10, 19 and 20 have a similar structure to that of the light-receiving element array 9.

Figure 6:
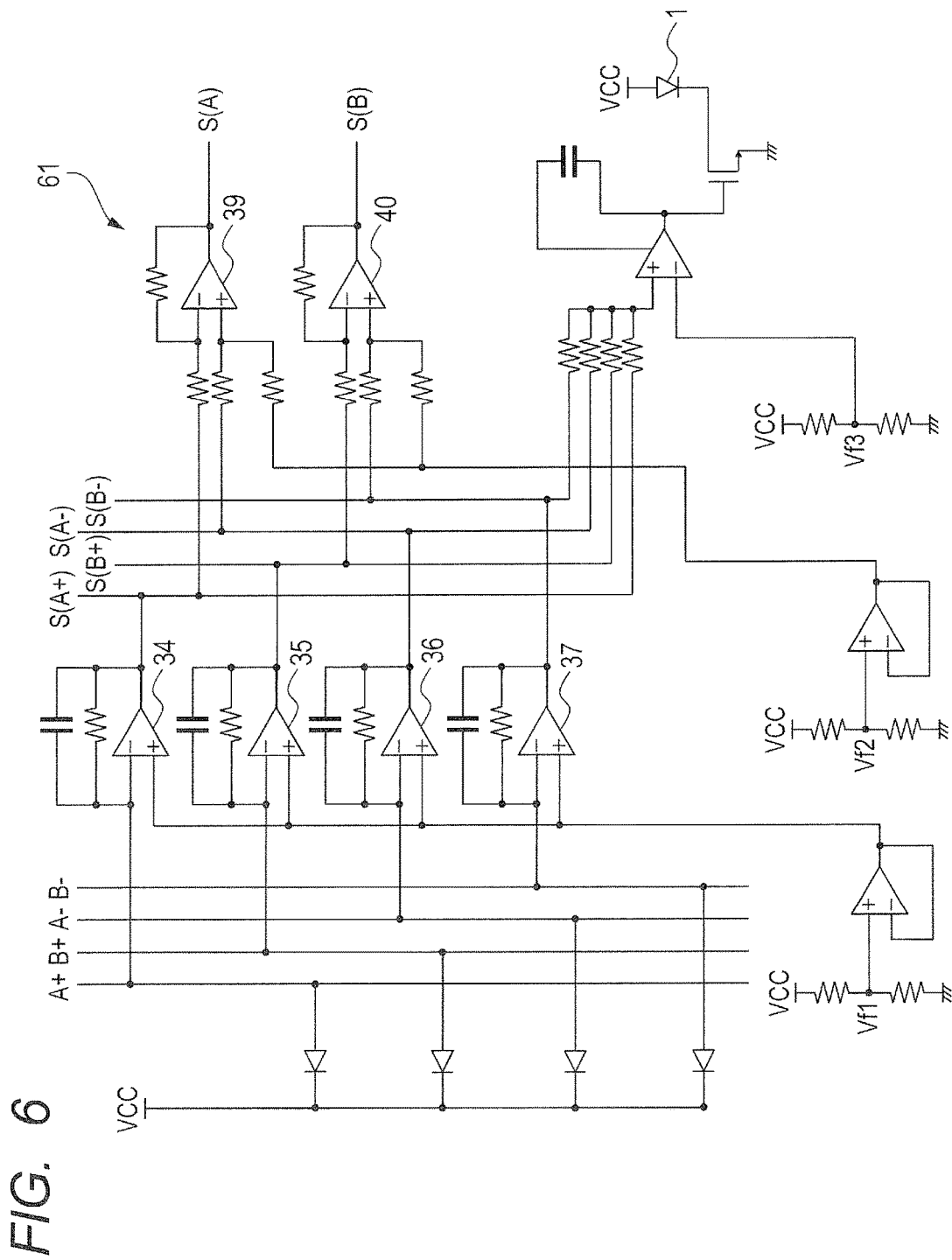
FIG. 6 is a circuit diagram illustrating a processing circuit in a processing system.

FIG. 6 is a circuit diagram illustrating the processing circuit 61 of the processing system 60. The configuration and the processing operation of the processing circuit 61 will be described below. The processing circuits 62, 63 and 64 have the same configuration as the processing circuit 61.

The processing circuit 61 has four I-V conversion amplifiers 34, 35, 36 and 37 which are first stage amplifiers that are connected to the outputs of the light-receiving element array 9. The four I-V conversion amplifiers 34, 35, 36 and 37 generate four-phase sine wave outputs S(A+), S(B+), S(A−) and S(B−), from outputs (read signals) A+, B+, A− and B− of the light-receiving element array 9. The relative phase of the four-phase sine wave has relationships that S(B+) is approximately +90 degrees, S(A−) is approximately +180 degrees, and S(B−) is approximately +270 degrees from S(A+), with respect to the detection pitch.

In addition, the processing circuit 61 has a differential amplifier 39 for an A phase, which calculates the following expression (1), based on S(A+) and S(A−) among the four-phase sine wave outputs S(A+), S(B+), S(A−) and S(B−). In addition, the processing circuit 61 has a differential amplifier 40 for a B phase, which calculates the following expression (2), based on S(B+) and S(B−) among the four-phase sine wave outputs S(A+), S(B+), S(A−) and S(B−). The two-phase sine wave signals S(A) and S(B) from which a direct current component has been removed are generated by the calculations of expressions (1) and (2).

$$S(A)=S(A+)-S(A-) \tag{1}$$

$$S(B)=S(B+)-S(B-) \tag{2}$$

Here, it is desirable to correct an offset error and a gain ratio that are included in the two-phase sine wave signals S(A) and S(B), which originate in dispersions of offsets and gains, and the like, in each of the amplifiers.

Therefore, the processing apparatus 65 illustrated in FIG. 3A determines an amplitude ratio, based on (maximum value−minimum value)/2 of each of the two-phase sine wave signals S(A) and S(B) in the predetermined region, and corrects the amplitudes so as to become equal to each other. Similarly, the processing apparatus 65 determines an amount of offset error from (maximum value+minimum value)/2, and corrects the offset. In either case, the processing apparatus 65 stores the corrected value in the storage unit 66, reads out the corrected value at the time of position detection, and performs the correction.

Furthermore, the processing apparatus 65 performs a calculation of the following expression (3).

$$\Phi 2 = A\ TAN\ 2[S(A), S(B)] \quad (3)$$

Here, A TAN 2[Y, X] is an arctangent function which discriminates the quadrant and converts the discriminated quadrant to the 0 to $2\pi$ phase.

Figure 7:
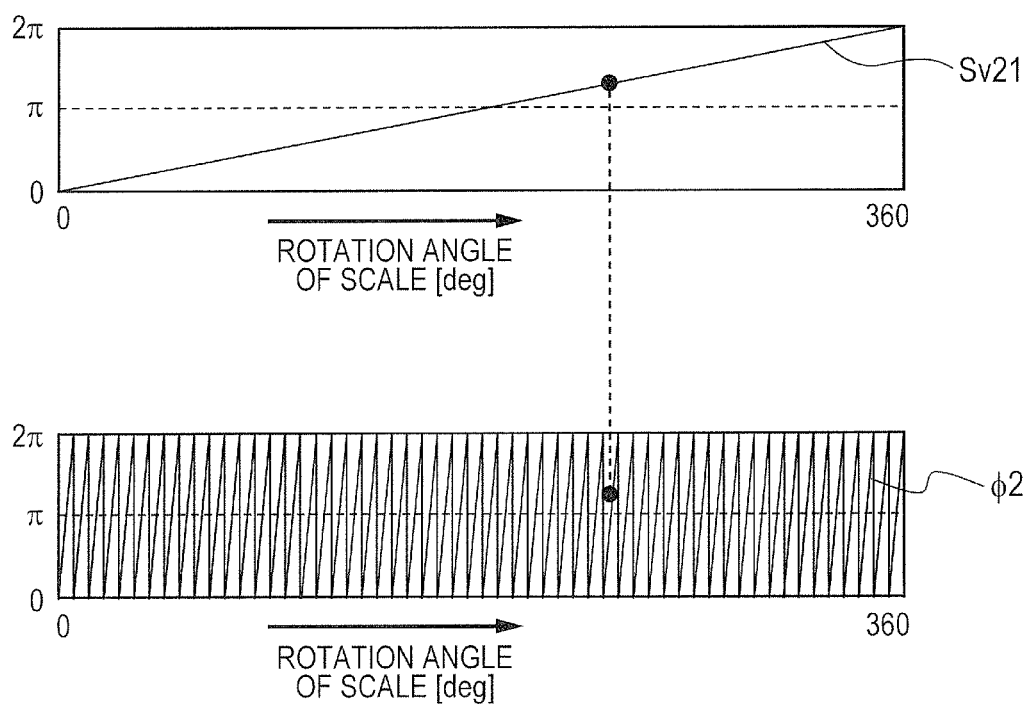
FIG. 7 is a view illustrating a relationship among a vernier signal Sv21, a phase Φ2 and a rotation angle of the scale.

FIG. 7 is a view illustrating a relationship among the vernier signal Sv 21, the phase $\Phi 2$ and the rotation angle of the scale 2. The phase $\Phi 2$ becomes as illustrated in FIG. 7, and can be used for detecting a relative change in the rotation angle of the scale 2, as an increment signal.

Next, the acquisition of rotational phase information of the track 41 will be described below. As has been described above, the processing circuit 62 has a similar circuit configuration to that of the processing circuit 61. As a result, the processing circuit 62 generates two-phase sine wave signals S(A)' and S(B)' from the read signals which the processing circuit 62 has acquired from the light-receiving element array 10 of the sensor unit 7.

Here, as has been described above, if the radius position to be read on the scale 2 at the time when the light-receiving element array 9 reads the track 42 is adjusted to 33.593 mm, P$\theta$2 becomes 128 μm. In the present embodiment, the distance D1 between the light emission center of the light source 1 and each of the light receiving centers of the light-receiving element arrays 9 and 10 is 1.75 mm, and accordingly the radius position to be read on the scale 2 at the time when the light-receiving element array 10 reads the track 41 becomes 31.843 mm.

In this case, the period P$\theta$1 of the signal that is obtained from the track 41 becomes 121.3 μm which deviates from twice the pattern period on the scale 2 with respect to the detection pitch (=128 μm) of the light-receiving element array 10. Because of this, it is desirable that the processing apparatus 65 performs correction processing for relative phase difference between the two-phase sine wave signals S(A)' and S(B)'. Hereafter, a method for correcting the phase difference will be described.

The two-phase sine wave signals S(A)' and S(B)' which include an error e of the relative phase difference are expressed by expressions (4) and (5), where $\theta$ represents the phase.

$$S(A)' = \cos(\theta + e/2) \quad (4)$$

$$S(B)' = \sin(\theta - e/2) \quad (5)$$

Then, from the expressions (4) and (5), the sum of and the difference between the two-phase sine wave signals S(A)' and S(B)' are calculated. Then, the error component e can be separated, as are shown in expressions (6) and (7).

$$S(A)' + S(B)' = 2\times\cos(\theta - \pi/4)\sin(e/2 - \pi/4) \quad (6)$$

$$-S(A)' + S(B)' = 2\times\sin(\theta - \pi/4)\cos(e/2 - \pi/4) \quad (7)$$

The error e of the relative phase difference can be expressed by $e = (1 - 128/121.3)\times\pi$ from the designed value.

Then, the processing apparatus 65 calculates the two-phase sine wave signals S(A) and S(B) in which the error of the phase difference shown in expressions (8) and (9) has been corrected, by multiplying the amplitude components $2\times\sin(e/2-\pi/4)$ and $2\times\cos(e/2-\pi/4)$ of the expressions (6) and (7), by inverse numbers, respectively.

$$S(A) = (S(A)' + S(B)')/(2\times\sin(e/2 - \pi/4)) = \cos\phi \quad (8)$$

$$S(B) = (-S(A)' + S(B)')/(2\times\cos(e/2 - \pi/4)) = \sin\phi \quad (9)$$

In the expression, $\phi = \theta - \pi/4$. However, the processing apparatus may store the error e of the relative phase difference in the storage unit 66, by the initialization operation.

For instance, the processing apparatus acquires the amplitude component $2\times\sin(e/2 - \pi/4)$ from (maximum value−minimum value)/2 of S(A)'+S(B)' in the range of the predetermined X direction. In addition, the processing apparatus may also acquire the amplitude component $2\times\cos(e/2 - \pi/4)$ from (maximum value−minimum value)/2 of −S(A)'+S(B)', and store the amplitude component in the storage unit 66. In this case, the processing apparatus can correct the error of the phase difference, while including influences of deviations of mounting heights of the light source 1 and the light-receiving element array 9, and of an error of an image magnification, which originates in the relative inclination between the scale 2 and the sensor unit 7. Incidentally, it is desirable to correct an offset error and a gain ratio that are included in the S(A) and S(B), which originate in the dispersions of the offsets and gains, and the like, in each of the amplifiers.

The processing apparatus 65 performs a calculation of the following expression (10), by using the two-phase sine wave signals S(A) and S(B) that have been obtained in the above described way.

$$\Phi 1 = A\ TAN\ 2[S(A), S(B)] \quad (10)$$

Furthermore, the processing apparatus 65 acquires the vernier signal Sv21 by the calculation of the following expression (11) using the expressions (3) and (10).

$$Sv21 = \Phi 2 - \Phi 1 \quad (11)$$

Here, when Sv21<0, the processing apparatus 65 performs a calculation of Sv21=Sv21+$2\pi$, and converts the value into an output range of 0 to $2\pi$. The relationship between the thus obtained vernier signal Sv21 and the rotation angle of the scale 2 becomes as illustrated in FIG. 7. The rotation angle of the scale 2 with respect to the vernier signal Sv21 can be uniquely determined, and accordingly it is possible to specify the rotation angle of the scale 2.

Even when only the vernier signal Sv21 has been used that has been obtained in this manner, the absolute angle can be detected, but in the present embodiment, the processing apparatus 65 performs synchronization processing between the vernier signal Sv21 and the phase $\Phi 2$, and generates a more accurate absolute angle signal ABS1 according to expression (12).

$$ABS1 = (ROUND[((Sv21/(2\pi))\times(FS/P\theta 2) - \Phi 2)\times(2\pi)] + \Phi 2/(2\pi))\times P\theta 2[deg.] \quad (12)$$

Here, ROUND[X] is a function which converts X into an integer closest to X. In addition, FS represents the total rotation angle in the rotation angle direction, and FS=360 [deg.] in the present embodiment.

The value of ABS1 is set so as to take a value between 0 and $2^{22}$, by the processing apparatus performing the calculation of MOD [ABS1, $2^{22}$]. MOD [X, Y] is a function that converts X into a value of the remainder obtained by dividing X by Y.

As has been described above, the processing apparatus 65 determines the absolute angle signal ABS1 that is the first angle information, based on the read signal which has been obtained from the sensor unit 7.

Also in the sensor unit 17, as in the case of the sensor unit 7, the processing apparatus 65 determines a phase $\Phi 2'$ from the following expression (13), based on the two-phase sine wave signals S(A) and S(B) that are obtained by the light being incident on the light-receiving element array 19, which has been reflected from the track 42.

$$\Phi 2' = A\ \text{TAN}\ 2[S(A), S(B)] \quad (13)$$

In addition, the processing apparatus 65 determines a phase Φ1' from the following expression (14), based on the two-phase sine wave signals S(A) and S(B) that are obtained by the light being incident on the light-receiving element array 20, which has been reflected from the track 41.

$$\Phi 1 = A\ \text{TAN}\ 2[S(A), S(B)] \quad (14)$$

Furthermore, the processing apparatus 65 determines a vernier signal Sv21' by the calculation of the following expression (15) using expressions (13) and (14).

$$Sv21' = \Phi 2' - \Phi 1' \quad (15)$$

Here, when Sv21'<0, the processing apparatus 65 performs a calculation of Sv21'=Sv21'+2π, and converts the value into the output range of 0 to 2π. Even when only the vernier signal Sv21' has been used that has been obtained in this manner, the absolute angle can be detected, but the processing apparatus 65 performs synchronization processing between the vernier signal Sv21' and the phase Φ2', and generates a more accurate absolute angle signal ABS2 according to expression (16).

$$\text{ABS2} = (\text{ROUND}[((Sv21'/(2\pi) \times (FS/P\theta 2) - \Phi 2') \times (2\pi)] + \Phi 2'/(2\pi)) \times P\theta 2 [\text{deg.}] \quad (16)$$

The value of the absolute angle signal ABS2 is set so as to take a value between 0 and $2^{22}$, by the calculation of MOD [ABS2, $2^{22}$].

Thus, the processing apparatus 65 determines the absolute angle signal ABS2 that is the second angle information, based on the read signal which has been obtained from the sensor unit 17.

Figure 8:
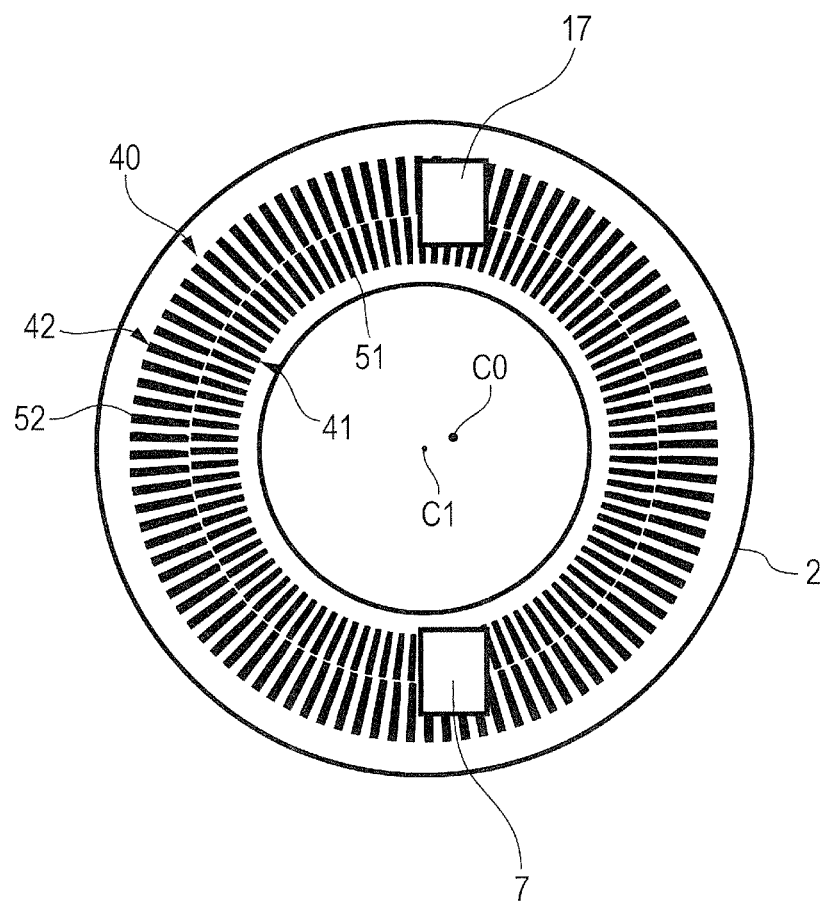
FIG. 8 is an explanatory view illustrating a case in which a center line of the scale is decentered from a rotational axis line.

Here, FIG. 8 is an explanatory view illustrating a case in which the center line C1 of the scale 2 is decentered from the rotational axis line C0. The scale 2 is mounted on the link 212 in a state of being decentered from the rotational axis line C0, or is decentered according to the situation of use or a period of service, in some cases.

Figure 9A:
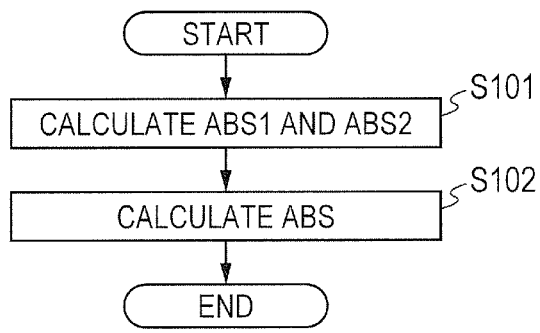
FIG. 9A is a flowchart for determining absolute angle information from which an eccentricity error of the center line of the scale from the rotational axis line has been removed.

FIG. 9A is a flowchart for determining the absolute angle information from which the eccentricity error of the center line C1 of the scale 2 from the rotational axis line C0 has been removed.

As has been described above, the processing system 60 determines the absolute angle signals ABS1 and ABS2 that are the first and second angle information, based on the read signals which are obtained from the pair of sensor units 7 and 17 (S101).

Here, the sensor unit 7 and the sensor unit 17 are arranged at positions at which the units become symmetric by 180 degrees with respect to the rotational axis line C0. As a result, the following expression (17) holds.

$$\text{ABS1} = \text{ABS2} + 180 [\text{deg.}] \quad (17)$$

The processing system 60 (processing apparatus 65) acquires the absolute angle information ABS from which the eccentricity error has been removed, by determining the average value between the absolute angle signal ABS1 and the absolute angle signal ABS2 (S102). The processing system 60 outputs a signal of the relative rotation angle of the scale 2 with respect to the pair of sensor units 7 and 71, in other words, a signal corresponding to the absolute angle information ABS, to the control apparatus 300.

More specifically, the processing system 60 (processing apparatus 65) calculates the absolute angle information ABS according to the following expression (18), based on the absolute angle signal ABS1 and the absolute angle signal ABS2.

$$\text{ABS} = (\text{ABS1} + \text{ABS2})/2 \quad (18)$$

The value of the absolute angle information ABS is made to take a value between 0 and $2^{22}$ by the calculation of MOD [ABS, $2^{22}$].

As in the above description, the processing system 60 outputs the signal corresponding to the absolute angle information ABS that is the relative rotation angle (absolute angle) of the scale 2 with respect to the pair of sensor units 7 and 17, based on the read information which has been obtained from the pair of sensor units 7 and 17, to the control apparatus 300.

By the way, when the eccentricity quantity (eccentricity error) of the center line C1 of the scale 2 from the rotational axis line C0 exceeds an allowable range (threshold), an error of the absolute angle information ABS with respect to the true value increases, even though the absolute angle information ABS is determined by averaging calculation.

Figure 13:
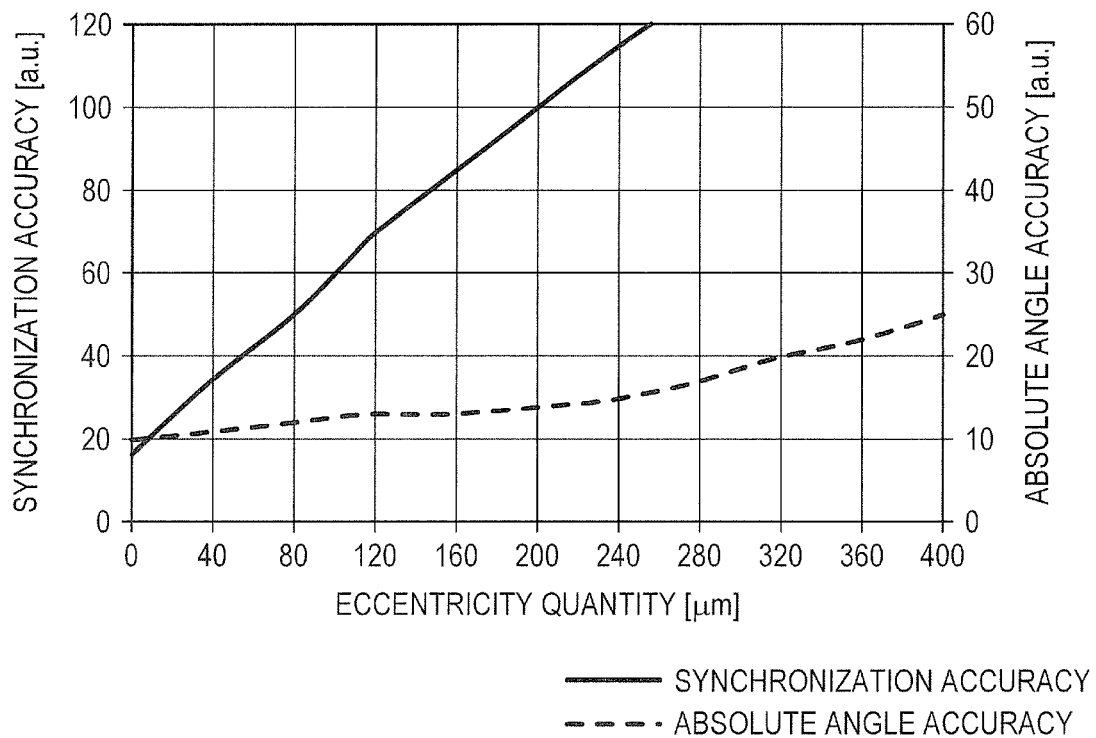
FIG. 13 is a graph illustrating a relationship among an eccentricity quantity of the scale, synchronization accuracy and absolute angle accuracy, in the absolute type rotary encoder of the reference example.

FIG. 13 is a graph illustrating a relationship among an eccentricity quantity of the scale in the absolute type rotary encoder of the reference example, synchronization accuracy and absolute angle accuracy. In order to calculate the absolute angle with high accuracy, the accuracy of synchronization between the plurality of signals ABS1 and ABS2 is important. As is illustrated in FIG. 13, when the eccentricity quantity is small (smaller than 200 μm), synchronization between the signals is secured, and by an operation of averaging the signals ABS1 and ABS2 to eliminate the eccentricity error, the influence on the accuracy of the absolute angle information ABS due to eccentricity of the scale 2 is slight. However, when the eccentricity quantity exceeds 200 μm, the synchronization accuracy results in exceeding a certain threshold value (for instance, 100 [a.u.]), and synchronization becomes unable to be secured. Accordingly, the absolute angle information ABS to be calculated results in largely deviating.

In the rotary encoder 260, eccentricity occasionally occurs between the rotational axis line C0 and the center line C1 of the scale 2, at the time when the rotary encoder has been incorporated into the robotic arm 201 or at the time of service and the like after the incorporation, due to overloading, the life of parts subject to periodic replacement such as a bearing, or the like. Because of this, when the eccentricity quantity becomes large to some extent, it becomes necessary to adjust the links 211 and 212 and the rotary encoder 260. In the present embodiment, in the processing system 60, information (eccentricity information) on the eccentricity of the center line C1 of the scale 2 from the rotational axis line C0 is calculated.

Figure 9B:
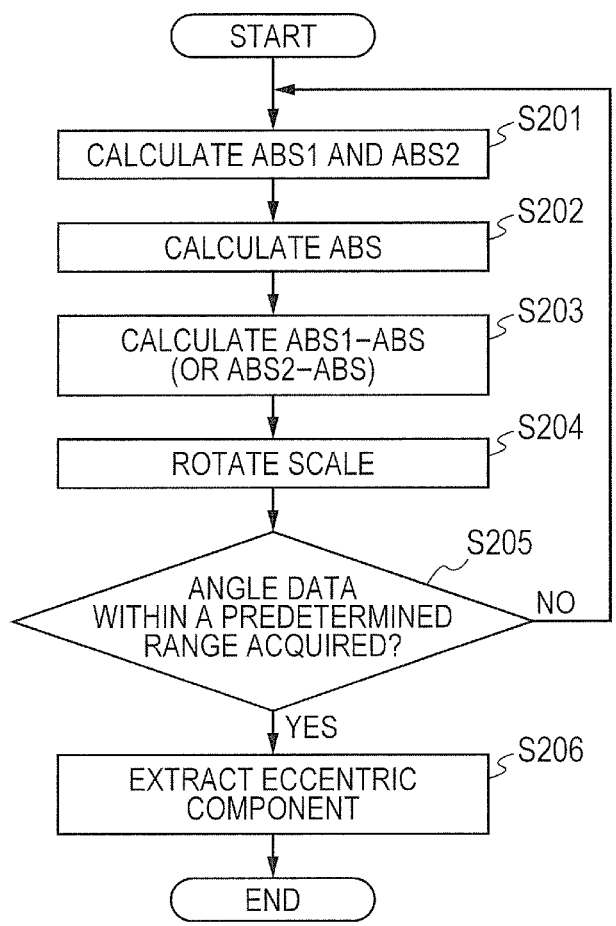
FIG. 9B is a flowchart of an eccentricity calculating method for determining an eccentric component of the center line of the scale from the rotational axis line.

FIG. 9B is a flowchart of an eccentricity calculating method for determining an eccentric component of the center line C1 of the scale 2 from the rotational axis line C0.

The processing system 60 determines the absolute angle signals ABS1 and ABS2 that are the first and second angle information, based on the read signals which have been obtained from the pair of sensor units 7 and 17 (S201).

The processing system 60 (processing apparatus 65) determines the absolute angle information ABS that is the average value between the absolute angle signal ABS1 and the absolute angle signal ABS2 (S202).

The processing system 60 (processing apparatus 65) determines a differential value (ABS1−ABS) between any one of the absolute angle signal ABS1 and the absolute angle signal ABS2 (in the present embodiment, absolute angle signal ABS1) and the absolute angle information ABS (S203).

The scale 2 rotates to the next rotation angle (S204), and the processing system 60 (processing apparatus 65) determines whether or not the processing system has acquired angle data in a predetermined range (S205). When having not acquired the angle data in the predetermined range (S205: No), the processing system 60 returns back to the processing in the step S201.

Thereby, the processing system 60 acquires the read signal according to the rotation angles from each of the pair of sensor units 7 and 17, at a plurality of rotation angles to which the processing system 60 has relatively rotated the scale 2 with respect to the pair of sensor units 7 and 17, and determines ABS1 and ABS2. Then, the processing system 60 determines the differential value (ABS1−ABS) between the ABS1 and the ABS, at the plurality of rotation angles.

Here, in order to make the calculation of the eccentricity state (eccentric component) highly accurate, which will be described later, it is desirable that the processing system 60 acquires a large number of angle data, by setting the rotating angle of the scale 2 at an angle range of 360 degrees or larger. In other words, the predetermined range in the step S205 is the angle range of 360 degrees or larger.

The differences between each of the thus obtained angle information of the plurality of sets of ABS1 and ABS are calculated, and then the following expression (19) is determined from the expression (18).

$$ABS1-ABS=ABS1-(ABS1+ABS2)/2=(ABS1-ABS2)/2 \quad (19)$$

Assuming that the center line C1 of the scale 2 has eccentricity, the eccentric component contained in ABS1 shall be represented by A'×sin θ, and the eccentric component contained in ABS2 shall be represented by A'×sin(θ+π). Here, A' is the amplitude of the angle information that shows the error of the angle information which originates in the eccentricity, by a resolution of 22 bits, and θ is a phase of the error of the angle information which originates in the eccentricity.

Assuming that the read angle of the sensor unit 7 in the case where there is no eccentricity in the center line C1 of the scale 2 is represented by ABS1' and the read angle of the sensor unit 17 in the case where there is no eccentricity in the center line C1 of the scale 2 is represented by ABS2', the ABS1' and the ABS2' can be expressed by the following expressions (20) and (21).

$$ABS1=ABS1'+A'\times\sin\theta \quad (20)$$

$$ABS2=ABS2'+A'\times\sin(\theta+\pi) \quad (21)$$

When the expressions (20) and (21) are used, the expression (19) can be expressed as the following expression (22).

$$ABS1-ABS=(ABS1'+A'\times\sin\theta-(ABS2'+A'\times\sin(\theta+\pi)))/2 \quad (22)$$

Here, sin(θ+π)=−sin θ, and accordingly the expression (22) can be expressed as the following expression (23).

$$ABS1-ABS=(ABS1'-ABS2')/2+A'\times\sin\theta \quad (23)$$

Here, the value of (ABS1−ABS) is set so as to take a value between 0 and $2^{22}$, by the processing apparatus performing the calculation of MOD [ABS1−ABS, $2^{22}$].

Figure 10:
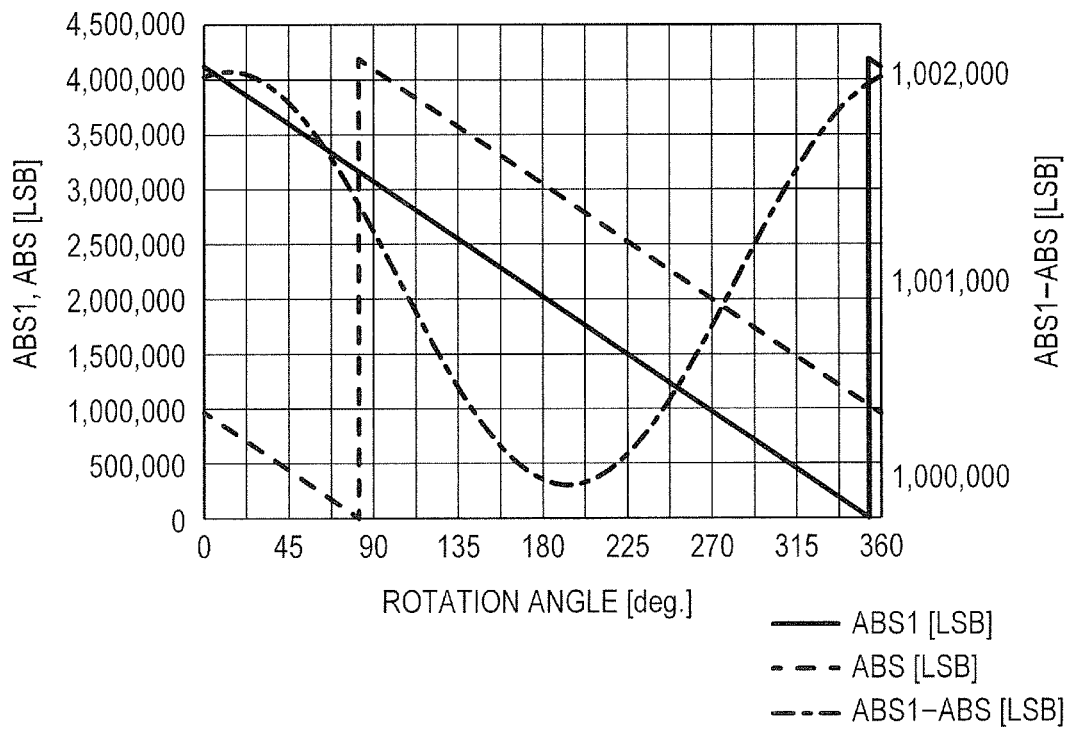
FIG. 10 is a graph illustrating one example of angle information of ABS1, ABS and (ABS1−ABS), which is obtained by rotating the scale by 360 [deg.].

FIG. 10 is a graph illustrating one example of angle information of ABS1, ABS and (ABS1−ABS) which are obtained by rotating the scale 2 by 360 [deg.]. In FIG. 10, the horizontal axis represents the rotation angle of the scale 2.

The left vertical axis is the absolute angle information ABS (solid line) and the angle information ABS1 (dashed line), and the right vertical axis is the angle information (ABS1−ABS) (alternate long and short dash line). Each of the angle information is shown with a resolution (digital value) of 22 bits.

When the center line C1 has an eccentricity from the rotational axis line C0, the value of (ABS1−ABS) appears as a fluctuation component having features of a sine wave of one cycle, along with the rotation of the scale 2 by 360 [deg.], as is illustrated in FIG. 10.

Then, in the present embodiment, the processing system 60 (processing apparatus 65) rotates the scale 2 by 360 [deg.] or larger, and extracts the fluctuation component having features of a sine wave of one cycle of (ABS1−ABS) that has been expressed by the expression (23), in other words, the eccentric component (=A'×sin θ).

In this way, the processing system 60 (the processing apparatus 65) extracts the periodic fluctuation component contained in the differential value (ABS1−ABS), and thereby determines the eccentricity information (eccentric component (=A'×sin θ)) of the center line C1 of the scale 2 with respect to the rotational axis line C0 (S206).

As for a method of extracting A'×sin θ, it is possible to use Fourier analysis, in other words, FFT (Fast Fourier Transform) or a least-square method. Incidentally, another method than these methods may be used as long as the method can extract A'×sin θ.

Incidentally, in the above description, the case has been described in which the processing apparatus determines the differential value (ABS1−ABS), but the processing apparatus may determine a differential value (ABS2−ABS) between the absolute angle signal ABS2 and the absolute angle information ABS. In this case as well, it is possible to extract A'×sin θ.

Here, the value of the amplitude A' of the vibrational component (eccentric component) shows the eccentricity quantity [LBS] of the center line C1 from the rotational axis line C0. It is acceptable to use the value of the amplitude A' as it is, but in the present embodiment, the processing apparatus 65 determines the value of the amplitude A of the eccentric component expressed with a unit of mm, according to the following calculation.

The processing apparatus 65 performs the calculation of the following expression (24) which uses the value of the amplitude A' and the read radius R [mm] of the scale pattern in the sensor unit 7 and the sensor unit 17, and determines the value of the amplitude A of the eccentric component represented by a unit of mm.

$$A=2\times\pi\times R\times(A'/2^{22}) \quad (24)$$

The processing apparatus 65 may determine the value of R from the design value, or may determine the value by previously measuring the value before the incorporation of the rotary encoder. In the case where the processing apparatus obtains the angle information, based on the scale 2 having a 2-track structure as in the sensor units 7 and 17, the value of R is determined to be a radius from the center line C1 of the scale 2 to the light sources 1 and 11 of the sensor units 7 and 17. For instance, when the value A'=1000 LSB has been obtained at the radius R=32.718 mm, the value is calculated as approximately A=50 µm. Thus, a calculating method of eccentric according to the present invention enables the calculating of the eccentricity quantity from a single parameter such as the amplitude A of the eccentric component.

Like this, the eccentricity calculating method of the present invention can calculate the eccentricity quantity, based on one parameter of the amplitude A of the eccentric component.

If the eccentricity quantity is too large and synchronization between the signals cannot be secured, there is a possibility that an error occurs in any of the obtained angle information ABS1, ABS2 and ABS. Because of this, in the case of the absolute type of rotary encoder, it is desirable to check that the synchronization can be secured, by previously checking that the output angle difference between ABS1 and ABS2 is approximately 180 [deg.], or the like.

In addition, when the rotary encoder is in an eccentricity state of a boundary at which the synchronization can be secured or not, the rotary encoder does not become such a situation that the synchronization cannot be secured at all of the rotation angles of the scale 2, but becomes such a situation that the synchronization cannot be secured at a part of rotation angles. Because of this, it is acceptable to firstly acquire the absolute angle information in which synchronization can be secured by a method as in the above description, and to determine the difference obtained from the absolute angle information, for the subsequent rotation angle information. Thereby, the processing apparatus becomes capable of calculating correct absolute angle information for all of the rotation angles of the scale 2, and becomes capable of determining the eccentricity information also in such an eccentric state that synchronization cannot be secured in a part of rotation angles of the scale 2.

The processing system 60 (processing apparatus 65) outputs the eccentricity information (eccentricity quantity A (or A')) which the processing system 60 has determined according to the above described method, to the control apparatus 300. The control apparatus 300 controls a lamp unit 500 that issues warning, according to the input eccentricity information.

The lamp unit 500 emits different colors according to the eccentricity information as the warning, under the control of the control apparatus 300. Specifically, the lamp unit 500 has a plurality of lamps 501, 502 and 503, and accordingly the control apparatus 300 controls blinking of each of the lamps 501 to 503. Specifically, the control apparatus 300 selects a lamp to be lit according to the eccentricity information (eccentricity state), and issues the warning to an operator, by lighting the selected lamp. In addition, the control apparatus 300 turns off the lamps other than the selected lamp.

For instance, when the eccentricity quantity exceeds a first threshold (for instance, 200 μm), the control apparatus 300 turns on the red lamp 503, and turns off other lamps 501 and 502. In addition, when the eccentricity quantity exceeds a second threshold (for instance, ½ of 200 μm) which is lower than the first threshold, but is less than the first threshold, the control apparatus 300 turns on a yellow lamp 502, and turns off other lamps 501 and 503. Furthermore, when the eccentricity quantity is less than the second threshold value, the control apparatus 300 turns on the blue lamp 501 and turns off the other lamps 502 and 503. Incidentally, when the eccentricity quantity is the first threshold value, the control apparatus turns on the yellow lamp 502 or the red lamp 503, and when the eccentricity quantity is the second threshold value, the control apparatus turns on the blue lamp 501 or the yellow lamp 502. By the above warning, the robot apparatus can notify the operator of the eccentricity state or the like.

Incidentally, the lamp unit 500 has been described on only one which corresponds to the rotary encoder 260 arranged in the joint J2, but lamp units corresponding to just the number of the rotary encoders 260 which the robotic arm 201 has may be installed so as to correspond to the rotary encoders 260.

In the above description, the robot apparatus has been structured so as to notify the operator of the eccentricity state as the warning by a luminous color, but may omit the lamp unit 500 and display the warning on the display apparatus 600. In addition, even in any case where the robot apparatus issues the warning by the lamp unit 500 or issues the warning by the display apparatus 600, the robot apparatus may display eccentricity information on the display apparatus 600 at the same time. In this case, the robot apparatus can display the value of A which has been converted into the SI unit (mm unit) so that also the operator can understand. In addition, the robot apparatus may be configured to omit the lamp unit 500 so as not to issue the warning, and simply display the eccentricity information on the display apparatus 600.

As has been described above, according to the first embodiment, the robot apparatus can check the eccentricity state of the scale 2 by using the pair of sensor units 7 and 17 for detecting the angle, without additionally providing a detector for eccentricity detecting. Therefore, the robot apparatus is not provided with the detector for eccentricity detecting; and it is possible to miniaturize the rotary encoder 260 and reduce the cost accordingly.

In addition, when incorporating the rotary encoder 260 into the joints J1 to J6 of the robotic arm 201, an operator can grasp the eccentricity state, and accordingly can assemble the robotic arm by a throw-in method. Then, the operator can appropriately adjust the eccentricity, as needed. Therefore, it is possible to greatly reduce the cost for assembling the robotic arm 201 (robot 200).

In addition, in the rotary encoder 260 of the first embodiment, two sensor units 7 and 17 are arranged at positions that are symmetric with respect to the rotational axis line C0. Therefore, when the eccentricity quantity is smaller than the allowable range (for instance, 200 μm) and the synchronization between signals can be secured, the influence of the eccentricity of the scale 2 on the accuracy of the absolute angle information ABS is slight. In other words, the rotary encoder can accurately determine the absolute angle information ABS from which the eccentricity error has been removed, by the pair of sensor units 7 and 17.

By the way, the robotic arm that has incorporated the rotary encoder therein is installed in a manufacturing line of a factory or the like. An external force or an overload is occasionally given to the robotic arm, in the case or the like where the robotic arm collides with a member that constitutes the manufacturing line or with an adjacent robotic arm. In addition, when the robotic arm has been used for many years, periodic replacement parts such as bearings deteriorate. In an absolute type rotary encoder, in particular, when the eccentricity quantity exceeds an allowable range (for instance, 200 μm) due to these factors or the like, the synchronization cannot be secured and the obtained absolute angle information greatly deviates from the true value, as is illustrated in FIG. 13.

In the first embodiment, the operator can check the eccentricity state (eccentricity quantity) due to the aging of the robotic arm 201, by the lamp unit 500, the display apparatus 600 or the like. Accordingly, the operator can grasp an external force such as collision, the presence or absence of the overload, the deterioration of the periodic replacement parts, which originates in eccentricity, and the like, without disassembling the robotic arm 201. In other words, the rotary encoder 260 of the first embodiment can be used, by being applied to the robot apparatus 100, for an abnormality diagnosis and predictive maintenance activity of the robotic arm 201.

Second Embodiment

Next, a rotary encoder according to a second embodiment of the present invention will be described. There is a case where it is difficult to rotate the scale 2 of the rotary encoder 260 by 360 [deg.] or larger with respect to the pair of sensor units 7 and 17, depending on the arrangement portion of the rotary encoder 260. Specifically, in such a structure that the rotary encoder 260 is arranged in the joint of the robotic arm 201, there is the case where it is difficult to rotate the rotary encoder 260 by 360 [deg.]. When the joint is the rotary joint, for instance, the joint can be rotated by 360 [deg.] or larger, but when the joint is a swingable joint, the movable range of the joint is less than 360 [deg.], and the angle range in which the scale 2 rotates becomes smaller than 360 [deg.]. In this case, the processing system 60 (processing apparatus 65) determines the component other than the angle range in which the scale 2 rotates, in a periodic fluctuation component (eccentric component), by extrapolation processing.

Figure 11:
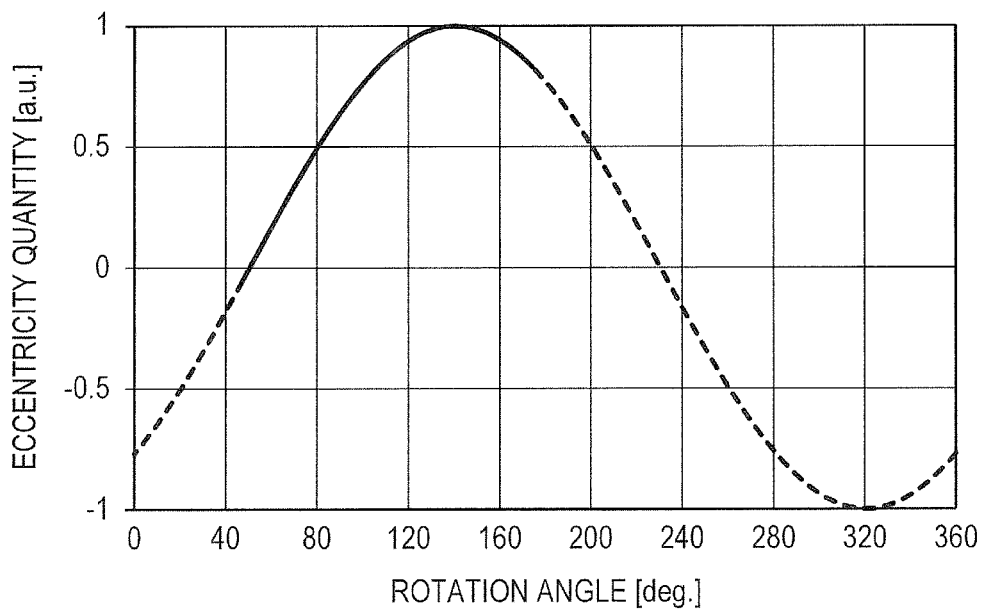
FIG. 11 is a graph illustrating one example in which fluctuation components are determined by extrapolation processing in a second embodiment.

FIG. 11 is a graph illustrating one example in which the fluctuation components are determined by the extrapolation processing in the second embodiment. As is illustrated in FIG. 11, the components other than the angle range of the scale 2, in other words, components other than the drive angle range of the link 212 can be determined by subjecting the obtained data of the fluctuation components to the extrapolation processing. Incidentally, in FIG. 11, the solid line shows the eccentric component obtained in the drive angle range (angle range of 120 [deg.]), and the dotted line shows data of the eccentric component other than the angle range, which has been calculated by subjecting the data of the solid line to extrapolation processing.

Thus, the rotary encoder can extract the fluctuation component that originates in the eccentricity of the scale 2 and has a feature of a sine wave of one cycle associated with the rotation of 360 degrees of the scale 2, even though the angle range in which the scale 2 rotates is smaller than 360 degrees.

Third Embodiment

Figure 12:
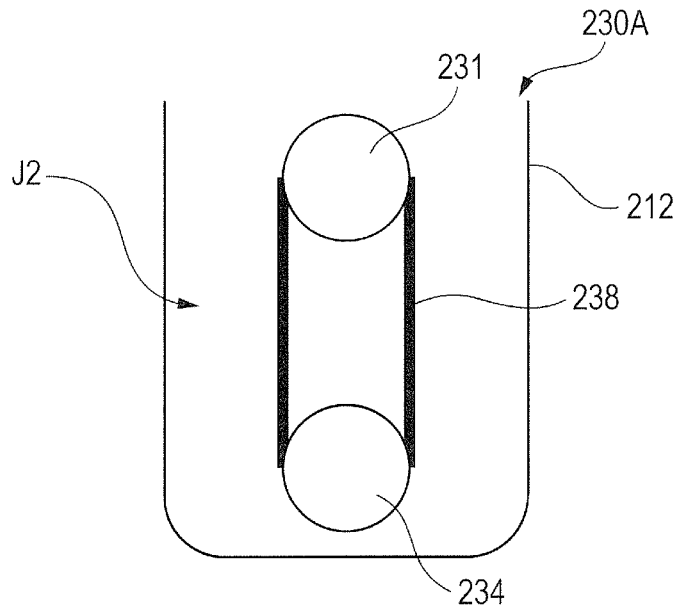
FIG. 12 is a schematic view illustrating a joint J2 of a robotic arm according to a third embodiment.

Next, a robot apparatus according to a third embodiment of the present invention will be described. In the above described embodiments, the case has been described in which the motor 231 and the speed reducer 234 are directly connected to the driving apparatus 230 that is arranged in the joint, but the driving apparatus is not limited to the case. FIG. 12 is a schematic view illustrating a joint J2 of a robotic arm according to a third embodiment. As is illustrated in FIG. 12, a driving apparatus 230A has the motor 231 and the speed reducer 234, similarly to that in the above described embodiments.

In addition, the driving apparatus 230A has a belt (transmission mechanism) 238 which connects a rotary shaft of the motor 231 with an input shaft of the speed reducer 234. Thereby, the driving apparatus 230A in the joint J2 is designed so as to become compact.

Incidentally, the present invention is not limited to the above described embodiments, but can be modified in many ways in a range of the technical concept of the present invention. Furthermore, in regard to the effects which have been described in the embodiments, the most suitable effects that are created by the present invention are merely enumerated, and the effects according to the present invention are not limited to the effects which have been described in the embodiments.

In addition, in the above described embodiments, the case has been described in which the robotic arm 201 is vertically articulated, but the robotic arm is not limited to the case. The robotic arm may be, for instance, various robotic arms such as a horizontally articulated arm, a parallel link and an orthogonal robot.

In addition, the scale 2 in the above described embodiments has been described as a vernier type of scale in which the pattern 40 has two tracks and is a pattern outwardly radial from the center line C1 of the scale 2, but the number of the tracks of the pattern 40 and the shape of the pattern 40 are not limited to those in the above scale. In addition, the present invention can be applied also to a rotary encoder that uses other type of scales such as a gray code, a BCD code and an M-based pattern.

In addition, in the above described embodiment, the case has been described in which the rotary encoder 260 is the absolute type, but the rotary encoder 260 may be an incremental type. This is because eccentricity information can be determined, based on fewer measurement points.

In the case of the incremental type, it is not necessary to secure the synchronization, which is different from the case of the absolute type, and accordingly the influence of the eccentric component on the accuracy of a detected angle is small. However, the present invention is useful for checking whether or not an external force and/or an overload have been applied to the robotic arm, and those degrees; further for checking whether or not periodic replacement parts such as bearings have deteriorated, and those degree; and for the like.

In addition, in the above described embodiment, the case has been described in which the rotary encoder 260 is arranged between the pair of links, but the present invention can be applied also to the rotary encoder 250 which is arranged in the motor 231.

In addition, in the above described embodiment, the case has been described in which the rotary encoder is applied to the robotic arm, but the rotary encoder can be applied also to various apparatuses other than the robotic arm. For instance, the present invention can be applied to a rotary encoder that detects a rotation angle of a lens barrel of a monitoring camera which has rotation driving mechanisms in a horizontal direction (pan) and in a vertical direction (tilt).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Effect of the Invention

The rotary encoder according to the present invention can check the eccentricity state of the scale by using a pair of sensor units.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194940, filed Sep. 30, 2016, which is hereby incorporated by reference herein in its entirety.

What is claimed is:

1. A detecting method for detecting eccentricity information of an encoder,
   wherein the encoder has a scale in which a pattern is arranged, and has a pair of sensor units that read the pattern of the scale,
   wherein the scale moves, relatively to the pair of sensor units, and
   the pair of sensor units are arranged so as to be opposite to each other sandwiching a rotational axis line therebetween,
   the detecting method comprising:
   acquiring an output signal from each sensor unit of the pair of sensor units, in a plurality of rotation angles by which the scale has been moved relatively to the pair of sensor units;
   determining first information based on the output signal that has been obtained from one of the pair of sensor units, and second information based on the output signal that has been obtained from the other one of the pair of sensor units;
   determining an average value of the first information and the second information;
   determining a differential value between any one of the first information and the second information and the average value; and
   detecting the eccentricity information, based on the differential value.

2. The detecting method according to claim 1, wherein the eccentricity information is an eccentricity quantity from an amplitude of a periodic fluctuation component.

3. The detecting method according to claim 2, further comprising:
   extracting the periodic fluctuation component by a Fourier analysis or least-square method.

4. The detecting method according to claim 2, wherein the angle range in which the scale rotates is smaller than 360 degrees, and components other than the angle range in the periodic fluctuation component are determined by extrapolation processing.

5. The detecting method according to claim 1, wherein, an angle range in which the scale rotates is 360 degrees or larger.

6. The detecting method according to claim 1, wherein the pattern comprises:
   a first track having a plurality of first marks that are arranged around a center line, and
   a second track that is arranged outside of the first track, and has second marks which are arranged, and of which the number is different from that in the first track, and
   each of the pair of sensor units reads the first track and the second track.

7. The detecting method according to claim 1, wherein the encoder is an absolute type.

8. An encoder system comprising:
   a scale in which a pattern is arranged;
   a pair of sensor units that read the pattern of the scale,
   wherein the scale moves relatively to the pair of sensor units, and
   the pair of sensor units are arranged so as to be opposite to each other sandwiching a rotational axis line therebetween; and
   a processing unit that outputs signals of the scale for the pair of sensor units, based on output signals obtained from the pair of sensor units,
   wherein the processing unit:
      acquires an output signal from each sensor unit of the pair of sensor units, at a plurality of rotation angles to which the scale has been moved relatively to the pair of sensor units;
      determines first information based on the output signal that has been obtained from one of the pair of sensor units, and second information based on the output signal that has been obtained from the other one of the pair of sensor units;
      determines an average value of the first information and the second information;
      determines a differential value between any one of the first information and the second information and the average value; and
      detects eccentricity information, based on the differential value.

9. The encoder system according to claim 8, wherein the encoder system is an absolute type.

10. A robotic arm comprising:
   a pair of links that are connected to each other by a joint; and
   the encoder according to claim 8,
   wherein in the encoder, the scale is arranged in one of the pair of links, and the pair of sensor units are arranged in the other one of the pair of links.

11. A robot apparatus comprising:
   the robotic arm according to claim 10; and
   a warning unit that issues warning according to the eccentricity information.

12. The robot apparatus according to claim 11, wherein the warning unit emits different colors according to the eccentricity information, as the warning.

13. The robot apparatus according to claim 12, wherein the warning unit has a plurality of lamps which emit light of different colors, respectively.

14. The robot apparatus according to claim 11, further comprising:
   a display unit which displays the eccentricity information thereon.

15. A robot apparatus comprising:
the robotic arm according to claim 10; and
a display unit which displays the eccentricity information thereon.

16. An imaging apparatus comprising:
rotation driving mechanisms; and
the encoder according to claim 8.

17. A non-transitory computer-readable recording medium storing a computer readable control program for operating a computer to execute a detecting method for detecting eccentricity information of an encoder,
wherein the encoder has a scale in which a pattern is arranged, and has a pair of sensor units that read the pattern of the scale,
wherein the scale moves, relatively to the pair of sensor units, and
the pair of sensor units are arranged so as to be opposite to each other sandwiching a rotational axis line therebetween,
the program comprising code to execute:
acquiring an output signal from each sensor unit of the pair of sensor units, in a plurality of rotation angles by which the scale has been moved relatively to the pair of sensor units;
determining first information based on the output signal that has been obtained from one of the pair of sensor units, and second information based on the output signal that has been obtained from the other one of the pair of sensor units;
determining an average value of the first information and the second information;
determining a differential value between any one of the first information and the second information and the average value; and
detecting the eccentricity information, based on the differential value.

* * * * *